United States Patent [19]

Uribe

[11] 4,180,358
[45] Dec. 25, 1979

[54] PIPE BEVELING ATTACHMENT FOR A POWER TOOL

[76] Inventor: Charles E. Uribe, Rte. 1, Box 11-B, Milton-Freewater, Oreg. 97862

[21] Appl. No.: 873,501

[22] Filed: Jan. 30, 1978

Related U.S. Application Data

[63] Continuation-in-part of Ser. No. 848,991, Nov. 7, 1977, abandoned, and a continuation-in-part of Ser. No. 769,921, Feb. 18, 1977, abandoned.

[51] Int. Cl.$^2$ ................................................. B23C 1/20
[52] U.S. Cl. .................................... 409/179; 82/4 C
[58] Field of Search .................... 90/12 R; 82/4 C; 51/241 S; 144/205; 408/104, 105, 106

[56] References Cited

U.S. PATENT DOCUMENTS

| | | | |
|---|---|---|---|
| 2,753,739 | 7/1956 | Drier | 82/4 C X |
| 3,555,904 | 1/1971 | Wallace | 90/12 R X |
| 3,691,881 | 9/1972 | Bachmann | 82/4 C |

FOREIGN PATENT DOCUMENTS

| | | | |
|---|---|---|---|
| 715780 | 12/1941 | Fed. Rep. of Germany | 90/12 R |
| 172963 | 10/1960 | Sweden | 90/12 R |

*Primary Examiner*—Gil Weidenfeld

*Attorney, Agent, or Firm*—Wells, St. John & Roberts

[57] ABSTRACT

An attachment for mounting a power tool, such as a hand drill or a router, having a cutter to enable the tool to be used to bevel the outside surface of hollow pipes. The attachment is capable of mounting a variety of different power tools and is adjustable to enable beveling the ends of pipes having different diameters. The device includes a base plate that mounts the power tool to one side thereof. The plate has an opening through which the rotary cutter projects forwardly. Also, projecting forwardly of the face plate are three freely rotatable guide rollers. The various elements are relatively adjustable in the plane of the face plate to accommodate pipes of different diameter. One of the rollers is utilized to engage the inside surface or core of a pipe end portion while the remaining two rollers engage the outside surface of the pipe at opposite sides of the rotary cutter. The pipe walls are movably guided between the three rollers with the rotary cutter engaged against the outside pipe surface at the pipe end. In operation, the device may be rolled about the pipe circumference as the rotary cutter forms the desired bevel, or the pipe itself may be turned about its center axis while the attachment is held stationary.

9 Claims, 9 Drawing Figures

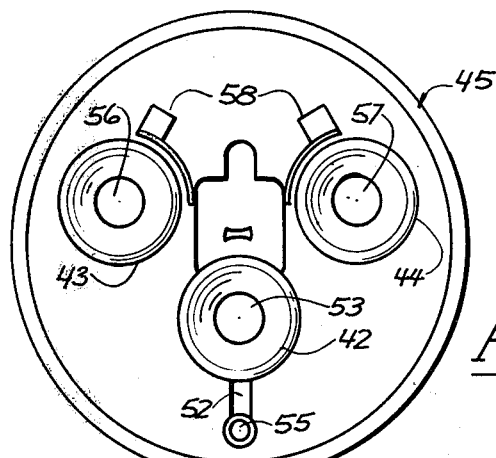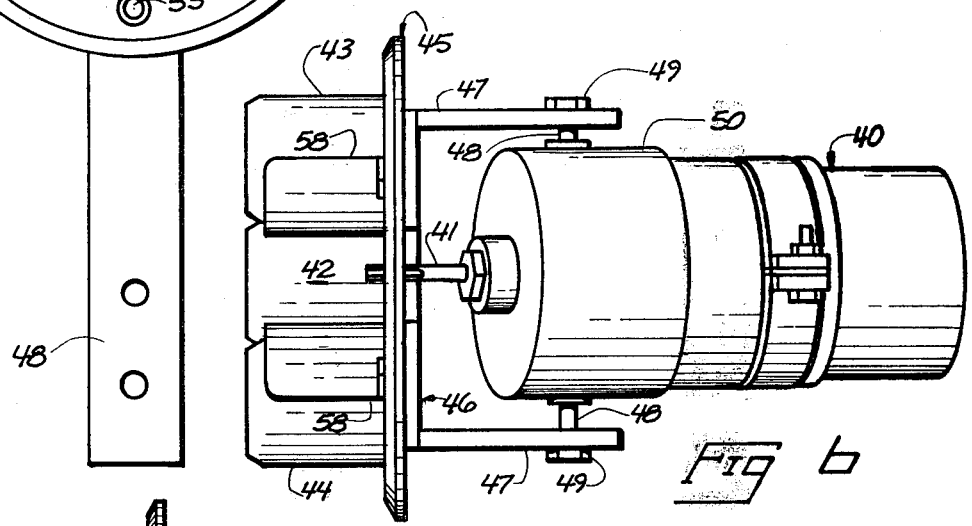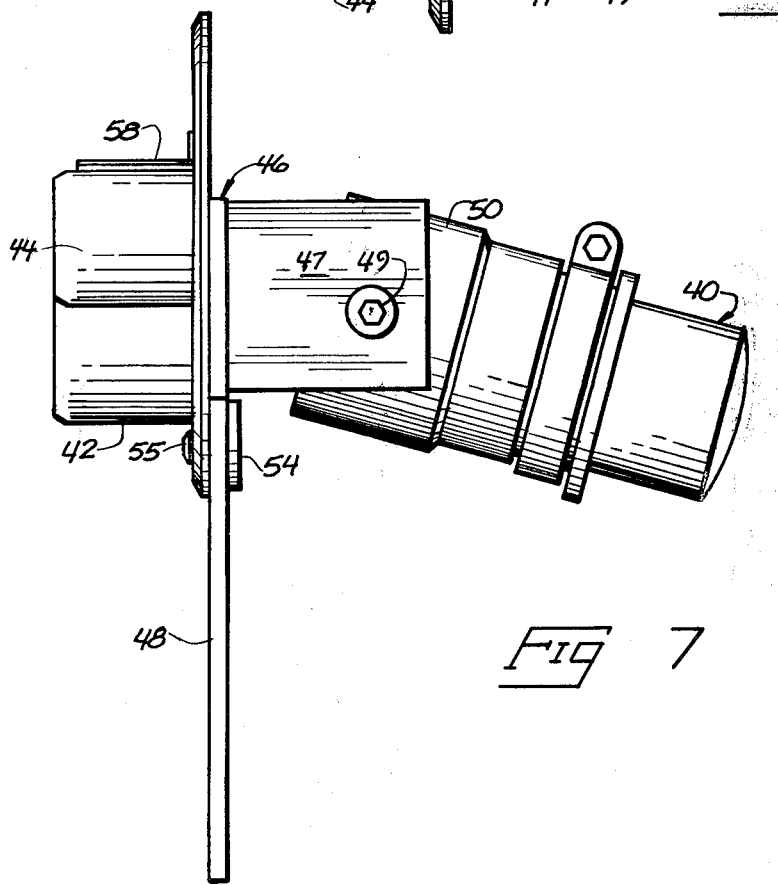

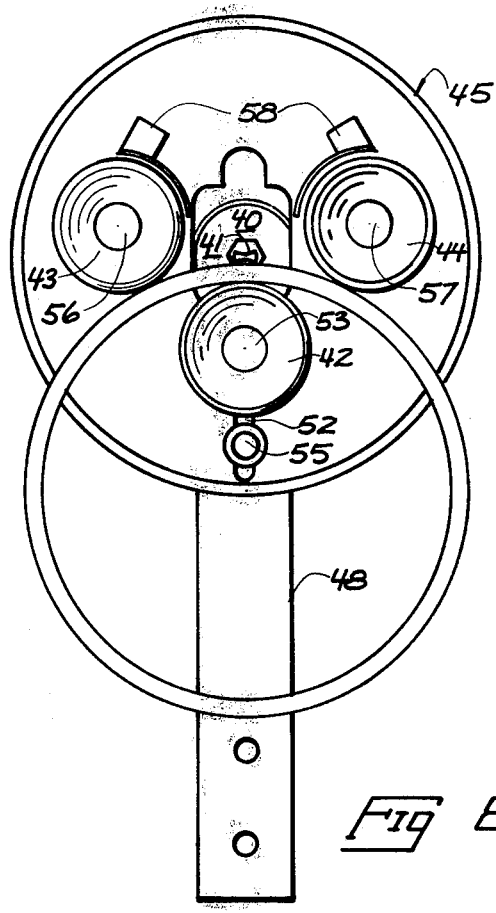
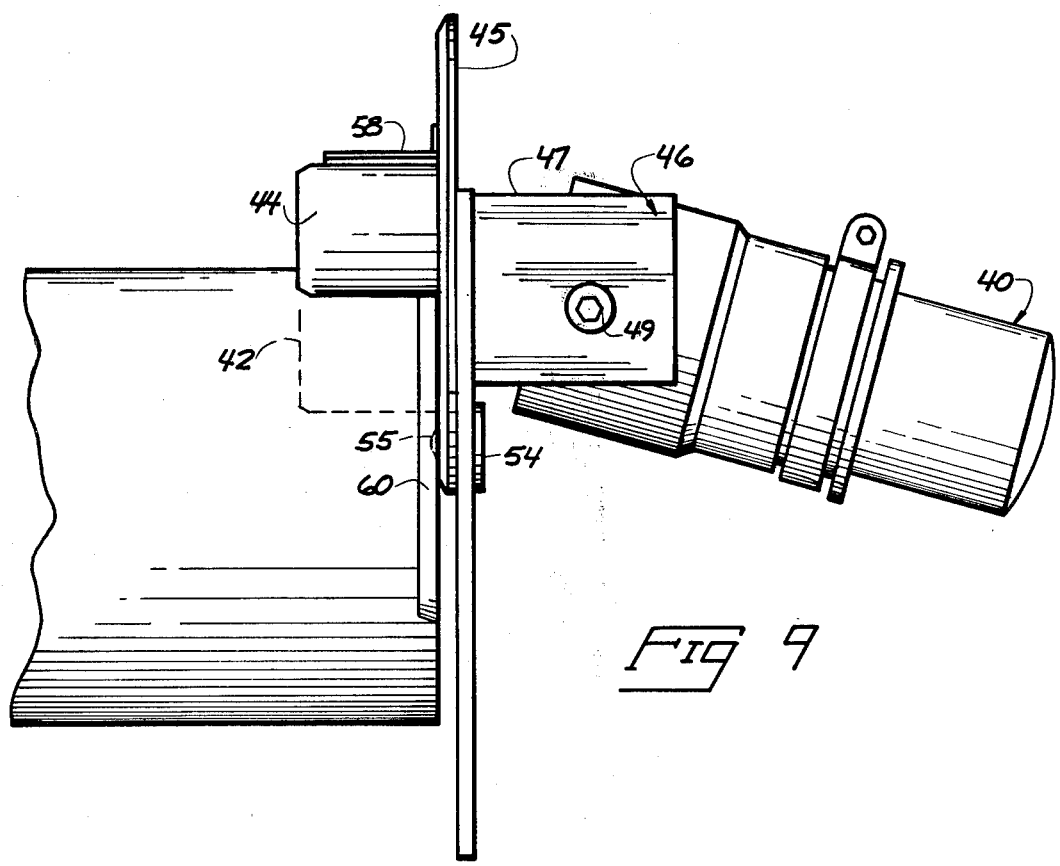

PIPE BEVELING ATTACHMENT FOR A POWER TOOL

This is a continuation-in-part of Application Ser. No. 848,991, filed Nov. 7, 1977 and Ser. No. 769,921, filed Feb. 18, 1977, both now abandoned.

BACKGROUND OF THE INVENTION

The present invention comprises a power tool attachment for beveling pipe. It is directed to the need for such tools that are portable for field use in beveling the ends of relatively large diameter plastic pipe.

It is often desirable when assembling long sections of plastic pipe in the field, to form a beveled end on one or both ends of the pipe sections in order to more securely fit them together and to facilitate gluing operations. Although some pipe is manufactured with beveled ends, it is usually necessary to form a bevel on the end of a pipe that has been cut to length at a particular job site. When it becomes necessary to bevel the end of a pipe at a job location today, manual procedures are used. The bevel is hand-formed by utilizing a file or rasp. This is a very tedious and time consuming task. Further, when the pipe ends are beveled by hand, there is no guarantee that the resulting bevel will fit properly within the adjoining pipe section. It therefore becomes desirable to obtain a tool by which consistent and precise angular bevels may be produced quickly and efficiently at the ends of pipes.

U.S. Pat. No. 3,636,803 to Miller granted on Jan. 25, 1972 discloses a hand-operating pipe beveling tool. This tool includes a knife for scraping or cutting a bevel on the outside surface of a pipe and an end trimming blade that functions to square the end of the pipe. The knife and blade are held on a crosspiece that is rotatably mounted to a central mandrel. This mandrel is necessarily the same diameter as the inside diameter of the pipe to be beveled. Thus, different mandrels must be utilized for different size pipe. Further, the beveling process is performed by hand without the advantage of using power equipment.

U.S. Pat. No. 3,699,828 to Piatek, which was granted on Oct. 24, 1972 discloses a pipe grooving tool. Here, a form of "routing" tool is utilized in combination with a series of clamp rollers in order to locate a cutting tool relative to the outside surface of a pipe. The rollers enable the tool to be moved about the pipe circumference to thereby allow the cutting tool to form an annular groove about the outside surface of the pipe. Four guiding rollers are described and are situated in pairs on directly opposite sides or surfaces of the pipe.

U.S. Pat. No. 3,162,002, granted to J. D. Hogden et al on Jan. 5, 1965, discloses a pipe cutter. Again, this device utilizes a central mandrel that fits within the core of a pipe to center and support the working elements of the cutting assembly for rotation about the mandrel axis. The mandrel size restricts the size of pipe. Different mandrels would be required where substantially different diameter pipes are to be cut. U.S. Pat. No. 3,103,140, granted to E. B. Connelly on Sept. 10, 1963, discloses a combination tool head for finishing pipe ends. This tool is probably exemplary of the form of tools utilized in pipe manufacturing operations to produce outside bevels at the ends of newly manufactured pipes. This device is substantially stationary in nature and is thus incapable of being utilized in field practice.

U.S. Pat. No. 3,540,328 to R. G. Foss, granted on Nov. 17, 1970, discloses an apparatus for tapering the ends of laminated plastic pipe. Again, this device makes use of a central support mandrel which is placed within the pipe core and expanded to tightly grip the pipe from within and provide rotational support for the pipe beveling structure mounted thereto. A cutting tool in the form of a number of knives is provided to form the desired bevel in the pipe as the tool is rotated about the axis of the stationary mandrel.

U.S. Pat. No. 3,202,190 to J. B. Gill, granted on Aug. 24, 1965, discloses an adjustable pipe machining tool. This device is disclosed as either being manually operable or motor powered to produce a beveled or reduced shoulder at the end of a pipe. Although no central support mandrel is disclosed in the drawings, the specification makes note that "the arbor may be of any suitable type which may be securely mounted in the end of the pipe to be machined and with the arbor shaft concentric with the pipe". The specification makes particular reference to a form of arbor illustrated in U.S. Pat. No. 2,607,376. The Gill apparatus is similar to the above cited apparatus in that it is dependent upon a central arbor or mandrel to locate the rotational axis of the cutting head.

The present invention does not make use of a central arbor or mandrel that fixes the tool itself for rotation about the axis of the arbor or mandrel. It has been found more productive to provide some means for moving a cutting tool about the exact pipe periphery as defined by the configuration of the pipe at its end. The result is a uniform bevel about the pipe. With the mandrel forms of beveling devices, a non-uniform bevel may be obtained where the pipe end has been slightly disfigured or is oval in configuration rather than being circular. This is a problem peculiar to plastic pipe. By utilizing a portion of the end surfaces of the pipe to guide the rotary cutter, I am able to form consistent and uniform bevels. Furthermore, by providing adjustment provisions, the present attachment is adaptable to fit a wide range of pipe diameters. A still further distinguishing characteristic of my invention is that it is adapted to be used in conjunction with standard forms of portable electric power tools. Other forms of beveling tools as disclosed above are either necessarily hand operated or contain their own integral power unit. The hand operated devices are adequate to a limited degree for field use but are relatively slow in comparison to the powered devices. On the other hand, the powered forms of beveling tools are necessarily expensive and their cost is seldom justifiable or is recovered only over an extended period of time.

BRIEF DESCRIPTION OF THE DRAWINGS

FIG. 5 is a front view of a second embodiment of the attachment;

FIG. 6 is a top view of the attachment seen in FIG. 5;

FIG. 7 is a side elevation view;

FIG. 8 is a front view showing use of the second embodiment; and

FIG. 9 is a side elevation view of the second embodiment in use.

DETAILED DESCRIPTION OF THE INVENTION

Figure 1:
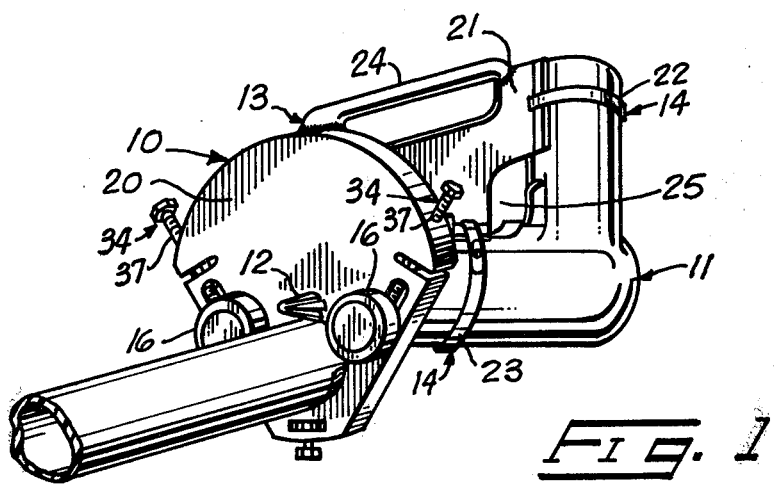
FIG. 1 is a pictorial view of a first embodiment of the present attachment for an electric drill.
Figure 2:
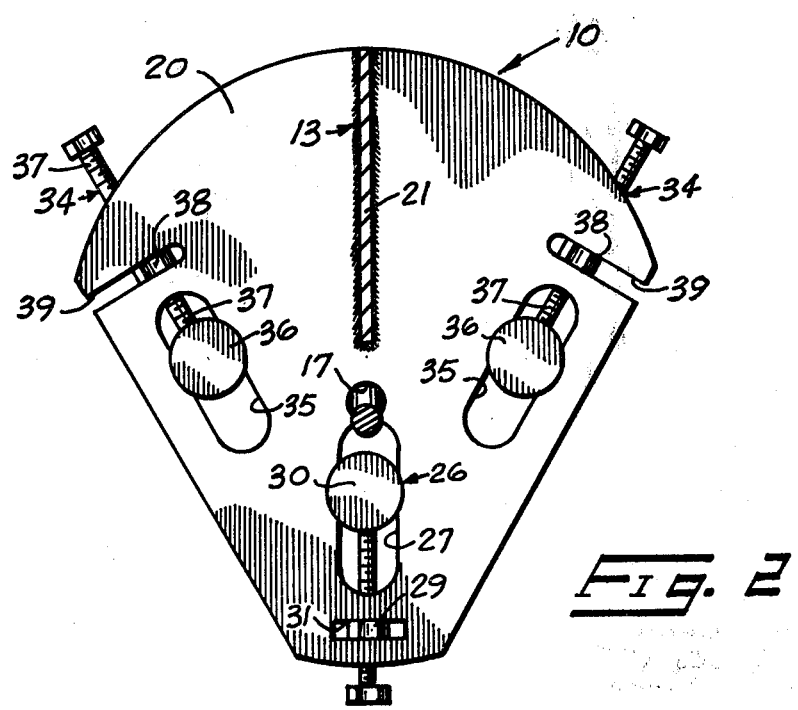
FIG. 2 is an enlarged sectional view taken substantially along line 2—2 in FIG. 3.

A first embodiment of the present attachment is shown in the accompanying drawings and is designated therein by the reference character 10. It is designed specifically for attachment to a conventional portable drill 11. A rotary cutter 12 is utilized in conjunction with the drill 11. Both drill 11 and cutter 12 are conventional items commonly utilized in many trades.

Figure 3:
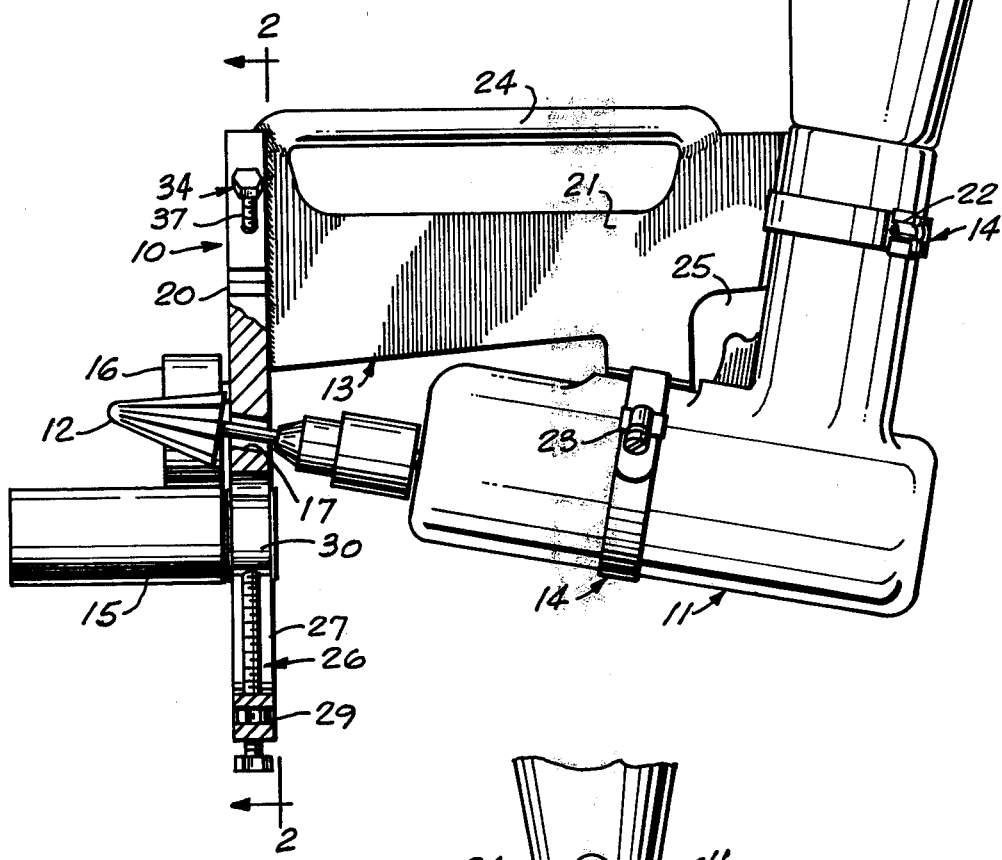
FIG. 3 is an enlarged side elevational view with a portion thereof broken away.
Figure 4:
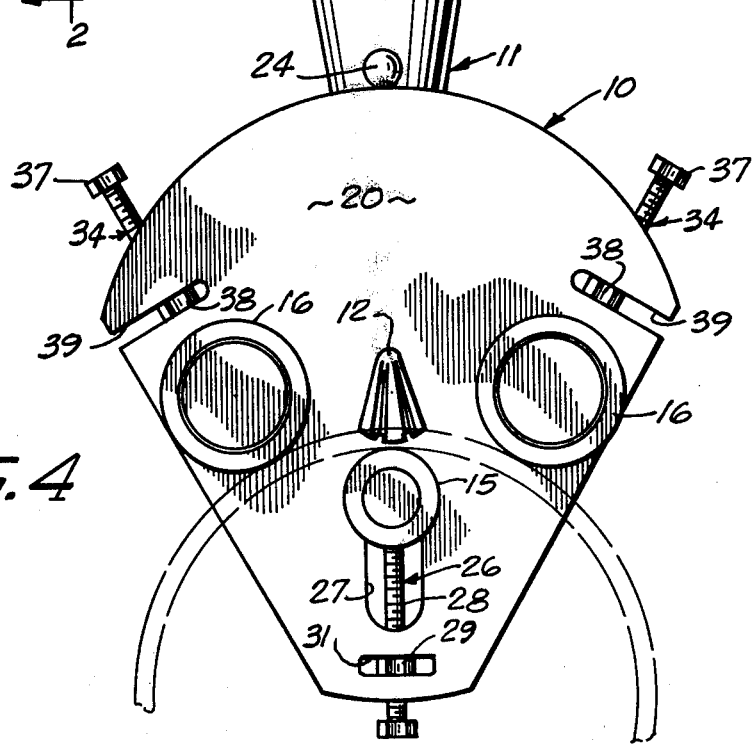
FIG. 4 is a front elevational view.

The attachment 10 includes a unitary base member 13. This base includes a mounting means 14 that secures the drill 11 in a particular fixed relation to the base as shown in FIGS. 1 and 3. The mounting means 14 is capable of receiving various forms of powered rotary tools, including drills of different configurations.

Base 13 rotatably supports three rollers that guide the attachment in an arcuate path determined by the curvature of an attached pipe as shown in FIG. 1. The first is a core engaging roller 15 intended to roll along the core or inner pipe surfaces. The remaining two rollers are identical and may be described as outer rollers 16 that roll against the outside surface of the pipe in order to maintain engagement of the core roller with the inside pipe surface and to hold the rotary cutter 12 in a selected angular position in relation to the pipe end. Rollers 15 and 16 are freely rotatable about axes that are parallel to one another and substantially perpendicular to the oppositely facing surfaces of a face plate 20 of base 13 to which the rollers are mounted. The face plate 20 also includes an angular aperture 17 through which the rotary cutter 12 is received. Thus, the rotary cutter 12 extends outward beyond the front surface of the face plate 20 at a location between the outer rollers 16 and in alignment with the core roller 15.

The tool mounting means 14 is comprised of a rearwardly extending bracket 21 that is an integral portion of the base 13. Bracket 21 has two flexible clamps 22 and 23 mounted thereon to receive and securely mount substantially any form of power tool. It is noted that the bracket 21 shown in the drawings is particularly adapted to receive and mount the "pistol" shaped drills. This form of drill is the predominant configuration of such drills in normal use. However, other shapes of drills are manufactured and, recognizing this, I contemplate other forms of drill brackets 21 for different drill configurations.

The drill bracket 21 includes a handle portion 24 for handling and carrying the attachment with the drill mounted thereto. In addition, bracket 21 includes a recess 25 allowing access to the drill actuating trigger.

Bracket 21 mounts the drill at an angle to face plate 20 such that the corresponding angular disposition of the rotary cutter will determine the bevel angle. This angle may also be selectively varied by the particular choice of the cutters.

The core engaging roller 15 is mounted to the face plate 20 by adjusting means 26. Adjusting means 26 includes an elongated slot 27 that is radially oriented with respect to the cutting tool aperture 17. The slot 27 receives a roller mounting slide 30. This slide 30 is connected to a bolt 28, which in turn is threadably mounted to a nut 29 received within a transverse slot 31. Nut 29 can be utilized to lock the core engaging roller in place or to enable radial adjustment of the roller 15 in relation to the aperture 17. By providing this adjustment, I can use the attachment on pipes of different diameter and of differing wall thickness.

The outside rollers 16 are similarly mounted to the face plate 20 by adjusting means 34. Means 34 is comprised of angular slots 35 that are located symmetrically at opposite sides of a center line intersecting the core engaging roller 15 and cutting tool aperture 17. Slots 35 receive outside roller mounting slides 36. These slides 36 are connected to threaded bolts 37 which are threadably connected with nuts 38. The nuts 38 are received within open slots 39 and operate as means for selectively locking the rollers 16 in position on the plate 20. The relative positions of the outer rollers 16 may be varied with respect to the core roller 15 and aperture 17 by adjusting the lock nuts 38 and bolts 36. In adjusting any of the rollers 15 or 16, one simply loosens the nut 29 or 38 from locking engagement with the face plate 20. The bolt 28 or 37 may then be turned to move the slide 30 or 36 within the associated slot.

By permitting one to vary the spacing of the outside rollers 16, I am able to adapt the attachment to pipe having a wide range of diameters. In addition, because of the relatively small diameter of the core roller 15, I am able to use the attachment on pipes of relatively small diameter. Since the device is not dependent upon a central supporting mandrel, the attachment will conform to the peculiar configuration of a pipe end whether it is circular or not. The result is a uniformly beveled pipe end, not dependent upon the uniformity of the pipe itself.

Before operation, the attachment is assembled with the mounting means 14 securely holding a drill 11 with its chuck facing aperture 17. A rotary cutter 12 is then inserted through the aperture 17 to become engaged by the drill chuck. The chuck is then tightened and the attachment is ready for use.

During use the attachment is positioned relative to a pipe end such that the core engaging roller 15 is held against the inside walls of the pipe with the rotary cutter 12 positioned to remove the desired amount of material from the pipe end. Adjustments are made as required for pipe size, utilizing the core roller adjusting means 26 and the outside adjusting means 34 to securely clamp the pipe walls between the three rollers. The bevel may then be cut by either rotating the pipe while the attachment is held stationary or by rotating the attachment to move the cutter 12 about the pipe periphery.

A second embodiment of the attachment is shown in detail in FIGS. 5 through 9. It operates in a manner substantially identical to that shown in FIGS. 1 through 4, but has been designed for more universal mounting of available powered rotary tools. The specific tool shown mounted to the attachment in FIGS. 5 through 9 is a conventional router 40, having a conventional rotary cutter or blade 41.

The attachment comprises a base that supports the power tool or router 40 at one side and three rollers 42, 43 and 44 at its opposite side. The base includes a disk 45 having oppositely facing planar surfaces and a yoke shaped bracket 46. Bracket 46 includes a pair of spaced projections 47 and an elongated handle 48. The router 40 is encircled by an adaptor casing 50 clamped to it by a releasable assembly shown at 51. The casing 50 is pivotably mounted between the projections 47 by means of oppositely protruding studs 48 and lock nuts 49. The casing 50 and router 40 can thus be angularly adjusted with respect to bracket 46 to provide the proper bevel angle at the pipe end being modified.

The disk 45 has an elongated opening 52 formed through it in alignment with the roller 42, which is a core engaging roller for the purposes previously described. Roller 42 is rotatably mounted about a support shaft 53 fixed to the bracket 46 and projecting through the opening 52. Bracket 46 is selectively locked or fixed with respect to disk 45 by means of a set nut 54 that threadably receives the shank of an adjustment wheel 55 guided along an outer extension of the opening 52 (FIGS. 8 and 9).

The two outer rollers 43, 44 are rotatably journaled about shafts 56 and 57, respectively. Shafts 56 and 57 are fixed to the disk 45, but could be mounted in adjustable slots if desired. They are partially surrounded by shields 58 which deflect a portion of the chips produced while the plastic pipe is being beveled.

The general operation of the attachment is substantially identical to that described with respect to FIGS. 1 through 4. The router 40 can be angularly adjusted and can be moved in conjunction with roller 42 to adapt the attachment to pipe of differing diameters. The handle 48 can be used to either maintain the attachment at a stationary position, or to facilitate rolling of the attachment about the periphery of the pipe. A typical end section of pipe as it is being beveled is shown at 60 in FIGS. 8 and 9.

It is understood that various changes and modifications may be made in the above described embodiments. The particular configurations of the attachment can be altered without changing the intended utility thereof. Therefore, only the following claims are to be taken as definitions of my invention.

What I claim is:

1. A pipe beveling attachment for a power tool having a rotary cutter, said attachment comprising:
   base means having first and second oppositely facing sides;
   a freely rotatable core engaging roller projecting axially outward from said first side of the base means, said core engaging roller being adapted to engage the inner wall surface at the end of a length of pipe;
   a pair of freely rotatable outer rollers projecting axially outward at said first side of the base means and individually located at symmetrical positions at opposite sides of the core engaging roller, said outer rollers being offset from the core engaging roller and adapted to engage the outer wall surface at the end of a length of pipe;
   an opening formed through said base means, said opening being aligned with said core engaging roller at a location between said pair of outer rollers;
   said base means including a bracket adapted to mount a power tool at said second side thereof with its rotary cutter projecting through said opening, said bracket being movably adjustable relative to the outer rollers.

2. A pipe beveling attachment as set out in claim 1 wherein said core engaging roller is rotatably journalled on said bracket.

3. A pipe beveling attachment as set out in claim 1 wherein said first side of said base means is planar;
   each of said outer rollers and said core engaging roller being rotatably mounted to said base means about axes parallel to one another and perpendicular to the planar first side of the base means.

4. A pipe beveling attachment as set out in claim 3 wherein the bracket includes mounting means for supporting the power tool about an axis perpendicular to a plane that contains the axis of the core engaging roller and bisects the separation between the axes of the outer rollers.

5. A pipe beveling attachment for a power tool having a rotary cutter, comprising:
   a base member;
   support means on the base member for mounting a power tool thereto with the rotary cutter facing the base member;
   an opening formed through the base member for receiving the rotary cutter of the power tool;
   a freely rotatable core engaging roller;
   core roller adjusting means on the base member mounting the core engaging roller to the base plate for selective movement of the core engaging roller in relation to the opening;
   outside roller means to each side of said core engaging roller for engaging and rolling over the outside surface of a pipe end whose inner surface is engaged by the core engaging roller to thereby guide the cutting tool in an arcuate path relative to the axis of the pipe end;
   said support means being movably adjustable relative to said outer roller means.

6. The attachment as set out by claim 5 further comprising core roller lock means on said base member associated with the core roller adjusting means for selectively fixing the position of the core engaging roller relative to the opening.

7. The attachment as set out by claim 5 wherein the base member includes a planer face plate portion and wherein the core engaging roller is elongated and rotatably mounted to said core roller adjusting means about a first roller axis, said first roller axis being perpendicular to the face plate portion.

8. The attachment as set out by claim 5 wherein the outside roller means is comprised of two freely rotatable rollers symmetrically located on opposite sides of a center line intersecting both the opening and the core roller.

9. A pipe beveling attachment for a power tool having a rotary cutter, said attachment comprising:
   a planar base member having oppositely facing front and back surfaces;
   an elongated slotted opening formed through the base member;
   a bracket movably mounted to the base member for motion parallel to the length of the slot, said bracket being extended outward from the back surface of the base member;
   means on said bracket adapted to adjustably support a power tool in a position wherein its rotary cutter extends forwardly through said opening;
   a core engaging roller;
   means on said bracket mounting said core engaging roller for rotation about a roller axis perpendicular to the front base member surface and protruding forwardly therefrom adjacent the intended rotary cutter position;
   and a pair of outer rollers journalled by the base member to each side of the core engaging roller about axes parallel to the core engaging roller axis, said outer rollers also protruding outward from the front base member surface.

* * * * *